No. 880,486. PATENTED FEB. 25, 1908.
W. L. GROFF.
MEAT HOLDER.
APPLICATION FILED JULY 9, 1907.
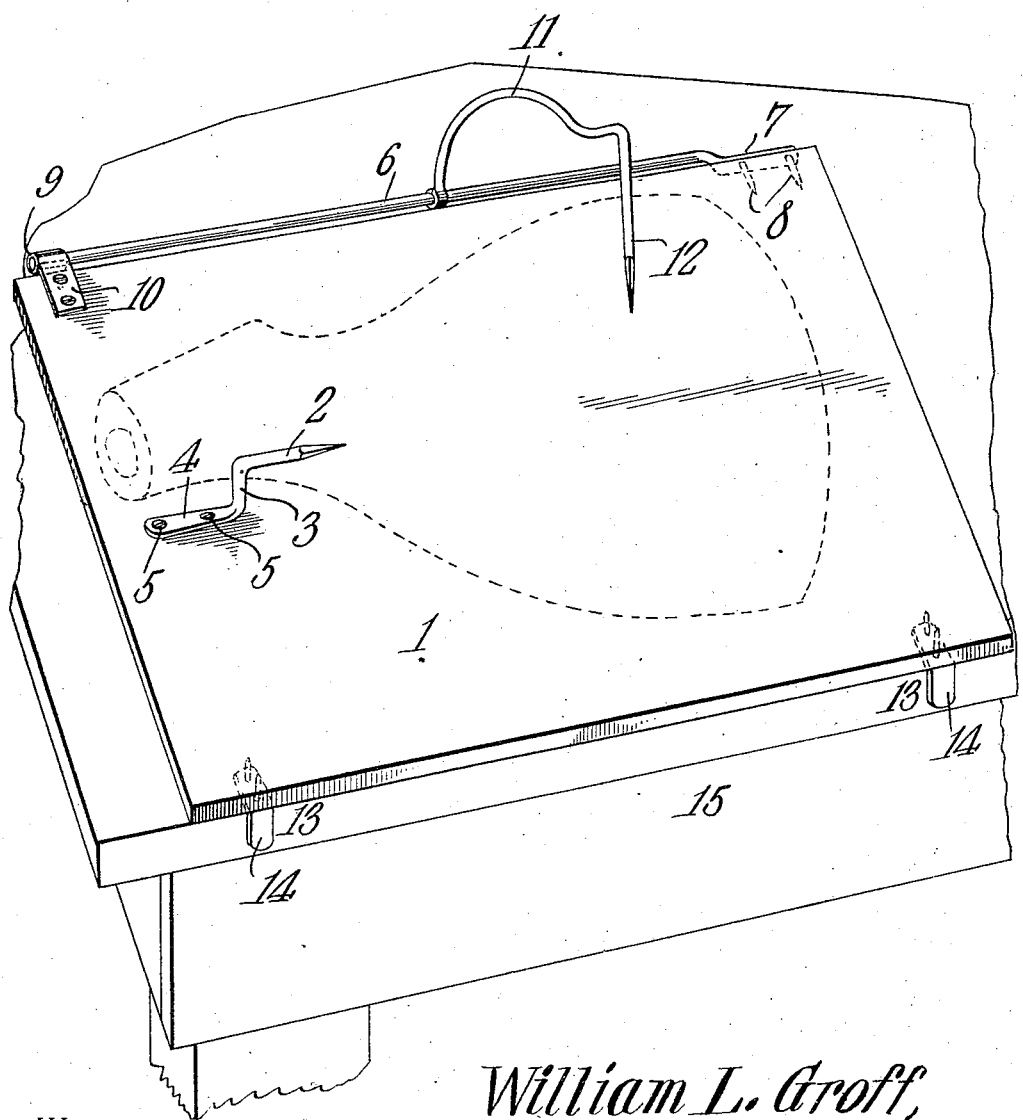
William L. Groff,
INVENTOR.
WITNESSES:
By C. A. Snow & Co.
ATTORNEYS

UNITED STATES PATENT OFFICE.

WILLIAM L. GROFF, OF LANCASTER, PENNSYLVANIA, ASSIGNOR OF ONE-HALF TO WILLIAM H. LENKER, OF SUSQUEHANNA TOWNSHIP, PENNSYLVANIA.

MEAT-HOLDER.

No. 880,486.　　　Specification of Letters Patent.　　　Patented Feb. 25, 1908.

Application filed July 9, 1907. Serial No. 382,850.

*To all whom it may concern:*

Be it known that I, WILLIAM L. GROFF, a citizen of the United States, residing at Lancaster, in the county of Lancaster and State of Pennsylvania, have invented a new and useful Meat-Holder, of which the following is a specification.

This invention relates to a meat holding device of that class in which the piece of meat is securely held by suitable prongs on a cutting surface so that it may be sliced or cut in a more presentable, economical and attractive manner. This object is obtained by rigidly fastening to the upper surface at one end of a suitable board a pointed horizontal pin and at the back a rod on which the movable hook is adapted to slide. These hooks hold the meat to be cut in place on the board, which latter is for convenience placed upon a table counter or other convenient surface and held thereon by suitable means on the front of the board engaging the edge of the table.

In the accompanying drawing, which is a perspective view of the meat holder resting on a table, the numeral 1 indicates the board on which the meat to be cut is placed, on the upper surface of which and by preference at the left end is securely fastened the horizontally disposed pin 2 raised a suitable distance above the board 1 by a vertical upright 3 on the rear of the pin 2. A flat plate 4 extending rearwardly from the upright 3 is fastened to the board 1 by screws 5 and holds the pin 2 in fixed position parallel to the front and back edges of the board 1. At the back edge of the board 1 is a rod 6, fastened at one end 7 directly to the edge of the board by screws 8 and extending parallel with said edge to the opposite end of said board where it is seated in an opening formed in the enlarged end 9 of a plate 10 screwed to the top of the board 1. Mounted so as to slide longitudinally on the rod 6 and at the same time to swing thereon in a vertical plane, is a hook 11 curving upwardly and forwardly towards the center of the board 1 where it is provided with a pointed end 12 which when in use is pushed into a piece of meat on the board. Fastened to the under side of the board 1 near each end is a bracket 13 preferably of right angular shape having an arm 14 extending downwardly from the board perpendicular to its under surface.

The use of this board is plainly apparent upon inspecting the drawing wherein it will be seen that the board 1 is placed upon a table, counter or other convenient support 15 and pushed rearwardly until the projections 14 strike the edge of the table, thereby preventing the board from moving away from the operator. The meat to be cut is placed upon the board after first turning the hook 11 backward, and pushed against the pin 2 so as to impale it thereon. The hook 11 is now brought forward and its pointed end forced into the meat through the top, by this means securely holding the piece of meat on the board. The position of the hook 11 in the meat may be changed by sliding it on the rod 6 so that as portions are cut from the meat the hook will be moved towards the left and pushed anew into the meat.

Having thus described the invention what is claimed is:—

1. A meat holder comprising a flat board, an immovable impaling pin at one end of said board directed inwardly, and a pivoted hook mounted on a fixed offset rod on the rear of the board and slidable toward and away from said impaling pin.

2. A meat holder comprising a flat board, a fixed horizontally disposed impaling pin at one end thereof, a straight rod secured immovably to the rear side of said board and spaced a short distance therefrom, and a hook pivoted to said rod and adapted to slide longitudinally thereon.

3. A meat holder comprising a flat board adapted to be placed upon a fixed support, downwardly projecting lugs attached to the front of said board and adapted to bear against the front edge of said fixed support, a horizontally disposed immovable impaling pin secured to one end of said board, a rod on the rear edge of said board and fixed thereto by an offset at one end and mounted in a plate at the other end, and a hook, curving upwardly from said rod and provided with a pointed impaling end, pivoted to said rod and adapted to move longitudinally thereon.

In testimony that I claim the foregoing as my own, I have hereto affixed my signature in the presence of two witnesses.

WILLIAM L. GROFF.

Witnesses:
　FRANK E. TAYLOR,
　JOHN S. DELLINGER.